(12) United States Patent
Hörsting et al.

(10) Patent No.: US 12,533,435 B2
(45) Date of Patent: Jan. 27, 2026

(54) PROCESS FOR PRESERVING A DISPERSION IN A METERING APPARATUS AND METERING APPARATUS

(71) Applicant: Brillux GmbH & Co. KG, Münster (DE)

(72) Inventors: Ingo Hörsting, Drensteinfurt (DE); Dietmar Erber, Münster (DE); Rainer Storb, Nottuln (DE); Sven Fels, Münster (DE); Ludger Drücker, Münster (DE)

(73) Assignee: BRILLUX GMBH & CO. KG, Münster (DE)

( * ) Notice: Subject to any disclaimer, the term of this patent is extended or adjusted under 35 U.S.C. 154(b) by 1071 days.

(21) Appl. No.: 17/291,348

(22) PCT Filed: Feb. 1, 2019

(86) PCT No.: PCT/EP2019/052537
§ 371 (c)(1),
(2) Date: May 5, 2021

(87) PCT Pub. No.: WO2020/094258
PCT Pub. Date: May 14, 2020

(65) Prior Publication Data
US 2021/0393829 A1  Dec. 23, 2021

(30) Foreign Application Priority Data
Nov. 5, 2018  (DE) .......... 102018008666.7

(51) Int. Cl.
*A61L 2/20*  (2006.01)
*A61L 2/26*  (2006.01)
(Continued)

(52) U.S. Cl.
CPC ............. *A61L 2/202* (2013.01); *A61L 2/26* (2013.01); *B01F 27/90* (2022.01); *B01F 33/841* (2022.01);
(Continued)

(58) Field of Classification Search
CPC ............ A61L 2202/122; A61L 2/202; A61L 2202/11; A61L 2202/15; A61L 2/26; B01F 2101/30; B01F 27/90; C09D 17/00
See application file for complete search history.

(56) References Cited

U.S. PATENT DOCUMENTS

| | | |
|---|---|---|
| 2,323,550 A | 7/1943 | Lukens |
| 2,713,545 A | 7/1955 | Kather |

(Continued)

FOREIGN PATENT DOCUMENTS

| | | |
|---|---|---|
| AU | 617422 | 11/1991 |
| CH | 618462 | 7/1980 |

(Continued)

OTHER PUBLICATIONS

English Translation of Driessen et al. (Year: 2008).*
(Continued)

*Primary Examiner* — Sean E Conley
*Assistant Examiner* — Aham Lee
(74) *Attorney, Agent, or Firm* — Honigman LLP; Andrew N. Weber; Jonathan P. O'Brien

(57) ABSTRACT

Shown and described here is a process for preserving a dispersion in a metering apparatus, wherein the dispersion is stored in a container (1, 101, 201) which is part of the metering apparatus, wherein an oxidant is introduced into the container (1, 101, 201). Also described are a metering apparatus configured for this process and a use of an oxidant for preserving dispersions.

12 Claims, 8 Drawing Sheets

Figure 1:
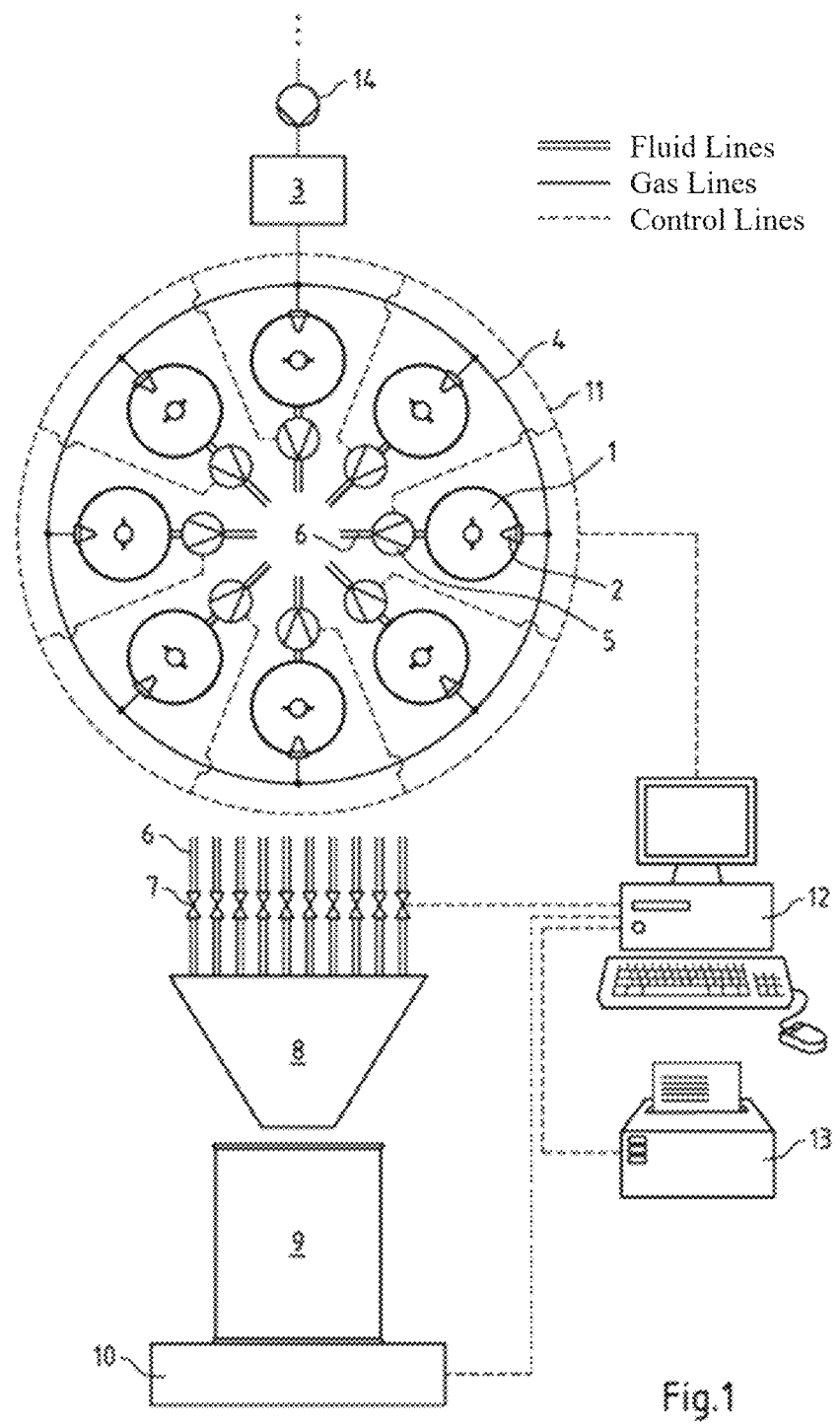

(51) Int. Cl.
    *B01F 27/90* (2022.01)
    *B01F 33/841* (2022.01)
    *B01F 101/30* (2022.01)

(52) U.S. Cl.
    CPC ...... *A61L 2202/11* (2013.01); *A61L 2202/122* (2013.01); *A61L 2202/15* (2013.01); *B01F 2101/30* (2022.01)

(56) References Cited

U.S. PATENT DOCUMENTS

| | | | |
|---|---|---|---|
| 3,574,651 A | 4/1971 | Nitzsche et al. | |
| 3,895,956 A | 7/1975 | Yoshida et al. | |
| 3,923,704 A | 12/1975 | Gunning et al. | |
| 4,063,958 A | 12/1977 | Roth et al. | |
| 4,125,673 A | 11/1978 | Roth et al. | |
| 4,137,380 A | 1/1979 | Gunning et al. | |
| 5,356,463 A | 10/1994 | Kober et al. | |
| 5,584,921 A | 12/1996 | Wagner et al. | |
| 5,998,525 A | 12/1999 | Wang et al. | |
| 6,468,336 B1 | 10/2002 | Fiedler et al. | |
| 6,638,353 B1 | 10/2003 | Rathschlag et al. | |
| 7,789,959 B2 | 9/2010 | Fichtner et al. | |
| 9,334,196 B2 | 5/2016 | Connors, Jr. et al. | |
| 2004/0057868 A1* | 3/2004 | McVey | A61L 2/202 422/123 |
| 2004/0222165 A1* | 11/2004 | Michocki | A23B 2/53 210/760 |
| 2005/0087545 A1* | 4/2005 | Petrus Engels | B01F 35/2117 222/77 |
| 2005/0150417 A1 | 7/2005 | Hirsbrunner et al. | |
| 2007/0021530 A1* | 1/2007 | Palumbo | C09D 11/30 523/160 |
| 2009/0211491 A1 | 8/2009 | Ogata et al. | |
| 2010/0119850 A1 | 5/2010 | Browne et al. | |
| 2013/0145966 A1 | 6/2013 | Schildbach et al. | |
| 2013/0170014 A1 | 7/2013 | Kong et al. | |
| 2017/0252509 A1* | 9/2017 | Caspers | A61M 5/14248 |
| 2019/0048214 A1 | 2/2019 | Hörsting et al. | |
| 2022/0184257 A1 | 6/2022 | Hörsting et al. | |

FOREIGN PATENT DOCUMENTS

| | | | | |
|---|---|---|---|---|
| CN | 2335633 | | 9/1999 | |
| CN | 101193992 | | 6/2008 | |
| CN | 101273097 A | * | 9/2008 | ........... C09B 67/006 |
| CN | 101322087 A | * | 12/2008 | ........... B01F 13/1058 |
| CN | 202777237 U | * | 3/2013 | |
| DE | 1031910 | | 6/1958 | |
| DE | 2745853 | | 2/1979 | |
| DE | 4424685 | | 1/1996 | |
| DE | 19654829 | | 6/1998 | |
| DE | 1259572 | | 7/2005 | |
| DE | 1089356 | | 1/2007 | |
| DE | 102009026039 | | 12/2010 | |
| DE | 102014013455 | | 3/2016 | |
| DE | 202014011090 | | 11/2017 | |
| DE | 202017107111 | | 8/2018 | |
| DE | 3446272 | | 2/2019 | |
| EP | 1138374 A1 | * | 10/2001 | ............ A45D 44/00 |
| EP | 1297079 | | 2/2003 | |
| EP | 1541225 | | 6/2005 | |
| EP | 1541225 A1 | * | 6/2005 | ......... B01F 13/1055 |
| EP | 1541225 B1 | * | 3/2007 | ......... B01F 13/1055 |
| EP | 1990102 | | 11/2008 | |
| EP | 2243808 | | 10/2010 | |
| EP | 2351590 | | 8/2011 | |
| EP | 2905268 | | 8/2015 | |
| EP | 3395454 A1 | * | 10/2018 | ............... A61L 2/04 |
| GB | 2121424 | | 12/1983 | |
| GB | 2292695 | | 3/1996 | |
| GB | 2292695 A | * | 3/1996 | ......... B01F 13/1019 |
| JP | 47-013184 | | 7/1972 | |
| JP | 59-25870 | | 2/1984 | |
| JP | 02-4864 | | 1/1990 | |
| JP | H04107824 | | 4/1992 | |
| JP | 07-278463 | | 10/1995 | |
| JP | 2005-139320 | | 6/2002 | |
| JP | 4562388 | | 10/2010 | |
| JP | 2011-079908 | | 4/2011 | |
| JP | 2005-336357 | | 12/2015 | |
| RU | 2142975 | | 12/1999 | |
| WO | 200068324 | | 11/2000 | |
| WO | 2001/048098 | | 7/2001 | |
| WO | 2004034775 | | 4/2004 | |
| WO | 2005073257 | | 8/2005 | |
| WO | 2007080612 | | 7/2007 | |
| WO | 2017144694 | | 8/2017 | |
| WO | WO-2018167528 A1 | * | 9/2018 | ............ A61H 33/14 |
| WO | 2020/165118 | | 8/2020 | |
| WO | 2020/212622 | | 10/2020 | |

OTHER PUBLICATIONS

English Translation of Palumbo (Year: 2008).*
English Translation of Post et al. (Year: 2001).*
English Translation of Orben et al. (Year: 2007).*
English Translation of Koehler et al. (Year: 2001).*
English Translation of Orben et al. (Year: 2005).*
English Translation of Tong (Year: 2013).*
Cancellation Request for DE 202017107111 Dated Dec. 21, 2018.
International Search Report for PCT/EP2017/054386 Mailed May 15, 2017.
Written Opinion of the International Searching Authority for PCT/EP2017/054386 Mailed May 15, 2017.
International Search Report for PCT/EP2020/053385. (German Language), Mailed Jun. 17, 2020.
International Search Report for PCT/EP2020/060993. (English Translation), Mailed Jul. 1, 2020.

* cited by examiner

PROCESS FOR PRESERVING A DISPERSION IN A METERING APPARATUS AND METERING APPARATUS

CROSS REFERENCE TO RELATED APPLICATIONS

This U.S. nonprovisional application is the 35 USC § 371 national phase of PCT Application No. PCT/EP2019/052537, filed on Feb. 1, 2019, which claims the benefit of DE Application No. 102018008666.7, filed on May 11, 2018. Each of these documents is hereby incorporated by reference in its entirety The invention relates to a process for preserving a dispersion in a metering apparatus, a metering apparatus, and a use of an oxidant for preserving a dispersion.

Metering apparatuses allow for the precise provision of a specific amount of a dispersion on request. When metering apparatuses are mentioned here or elsewhere, this basically means all systems that allow for a metered supply of a material. Metering apparatuses in this sense comprise at least one container and a closable valve.

Metering apparatuses are used, for example, in paint mixing apparatuses. An example of a metering apparatus for paints is described in DE 196 54 829 A1.

The dispersion stored in a metering apparatus sometimes remains in a container in the metering apparatus for several weeks and months. Preservatives are added to the dispersion so that the quality of the dispersion does not deteriorate during this time due to microbial infestation by bacteria or fungi. Common preservatives for this purpose are, for example, isothiazolines or formaldehyde releasers. The amount of preservative required exceeds the typically tolerable concentrations in aqueous coating systems.

There is thus a need for processes which make it possible to protect dispersions in containers of metering apparatuses against microbial infestation in the long term without having to resort to preservatives.

As a possible approach for this, EP 1 541 225 A1 describes a metering apparatus for mixing a dispersion paint, in which a container is provided for each paint component, which is connected via a conveying line to a metering valve arranged in the supply region to a mixing vessel, and whereby the containers for the aqueous paint components are formed by water- and gas-tight bags. The inner volume of the watertight bags shrinks when the container is emptied according to the volume of the container contents, so that the paint on the inner wall does not dry out and a microbial infestation is prevented in the gas space above the liquid level.

However, the metering apparatus described in EP 1 541 225 A1 cannot be topped off with new dispersion paint in a simple manner. In addition, existing microbial infestation in the bags can no longer be removed and the metering feed must be permanently adapted to the changed internal pressure in the bags for precise metering. Furthermore, the bags described in EP 1 541 225 A1 cannot easily be attached to an existing paint mixing apparatus or the like and must be disposed of after use, which creates packaging waste.

The object of the present invention is therefore to provide a process in which preservative-free or preservative-poor dispersions in the containers of metering apparatuses are protected against microbial infestation in the long term.

In addition, the object of the invention is to provide a particularly sustainable process for preserving dispersions in containers of metering apparatuses without having to resort to conventional preservatives, in particular isothiazolinones.

Another object of the present invention is to allow for a process that can be flexibly applied to already existing metering apparatuses and/or paint mixing apparatuses.

A further object of the invention is to provide a metering apparatus in which dispersions can be stored for a long time without being exposed to the risk of microbial infestation.

Further objects, some of which are listed below, result from the following embodiments.

All or some of these objects are achieved according to the invention by the process described herein, the metering system described herein, and the use described herein.

Advantageous embodiments of the invention are specified in the dependent claims and are explained in detail below.

According to the process according to the invention, an oxidant is introduced into the container in order to preserve a dispersion in a container which is part of a metering apparatus. The dispersion is preferably mixed thoroughly after it has been introduced into the container, for example by stirring.

Surprisingly, it has been shown that with a process for preserving a dispersion that is located in a container that is part of a metering apparatus, wherein an oxidant is introduced into the container, a dispersion can be protected for months against microbial infestation. The dispersion can be free of preservatives and still has long-lasting protection against microbial infestation. Even with frequent use of the metering apparatus and repeated filling of the container with fresh dispersion, protection against fungal and bacterial infestation is ensured by the process according to the invention.

Without wishing to be bound by any specific scientific theory, the oxidant introduced into the container appears to provide complete protection against microbial infestation by killing microbes such as fungi and bacteria by means of the oxidant.

The oxidant offers the dispersion long-lasting protection against microbial infestation. In particular when the dispersion is frequently removed from the container of the metering apparatus, it can make sense to introduce new oxidant into the container in order to renew the protection against microbial infestation. According to a preferred embodiment of the invention, the oxidant is introduced into the container at periodic intervals, preferably at least once a month or at least twice a month, more preferably at least three times a month, even more preferably at least once a week, most preferably once a day. By introducing the oxidant into the container at periodic intervals, the dispersion retains protection against microbial infestation for a particularly long time. If the oxidant is introduced at least once a day at periodic intervals, the dispersion can retain protection against fungal and bacterial infestation for several years.

It is expediently provided that 0.1 to 200 mg, preferably 0.5 to 100 mg or particularly preferably 1 to 50 mg, calculated per liter of container volume of the oxidant, are introduced per introduction. With these amounts, it has been found that a particularly good balance is achieved between the effective effect of the preservation protection by the oxidant and the lowest possible consumption of resources. Furthermore, efficient process control can be achieved in this way, in particular in the case of gaseous oxidants. For example, when using ozone as the oxidant, which is generated with an ozone generator with a generator output of 500 mg/h, an effective amount of oxidant can be introduced into the container within 5 minutes for an apparatus comprising twenty containers containing a dispersion.

In principle, the oxidant can be introduced into the container at different points. According to one embodiment of the process according to the invention, the oxidant is introduced directly into the dispersion via a supply line, so that the oxidant spreads in the dispersion. According to a further embodiment of the invention, the oxidant is introduced into the gas space above the surface of the dispersion into the container. With this preferred embodiment of the invention, it is possible to effectively preserve the particularly problematic region for microbial infestation in the gas space above the surface of the dispersion.

In principle, very different oxidants are suitable for preserving the dispersion.

Oxidants that are gaseous, liquid, or solid come into consideration in this case. Liquid and solid oxidants are preferably introduced as aqueous solutions, as this simplifies handling. In the case of the expediently provided introduction intervals and quantity additions, also at most slight dilution effects can be seen here.

The oxidant preferably has a standard potential of 0.1 V or higher, preferably 0.5 V or higher, more preferably 1 V or higher with respect to the standard hydrogen electrode at a temperature of 25° C. and an effective concentration of 1 mol $L^{-1}$ and/or an ionic activity of 1 or, in the case of gaseous reactants, at a partial pressure of 101.325 kPa.

Stronger oxidants fight microbial infestation more efficiently. In particular, isothiazolines are not oxidants for the purposes of the invention.

The oxidant is advantageously an oxygen-based or chlorine-based oxidant or a mixture thereof, preferably an oxygen-based oxidant. The oxidant is preferably selected from the group consisting of sodium hypochlorite, potassium hypochlorite, Javel water, chlorine, ozone, hydrogen peroxide, peroxyacetic acid, perborate, percarbonate, and mixtures thereof. These oxidants are strong oxidants that effectively prevent the growth of microbial organisms.

The oxidant is particularly preferably selected from the group consisting of sodium hypochlorite, hydrogen peroxide, ozone, and mixtures thereof. The oxidants from the group mentioned have proven particularly suitable for protecting the dispersion from microbial infestation, since they are effective oxidants. Furthermore, these oxidants are substantially unproblematic, in particular in the amounts expediently provided for the dispersion. In particular, in the case of the amounts expediently provided, the stated oxidants do not result in a significant change in the color and/or quality of the dispersion.

According to another preferred embodiment of the invention, the oxidant is gaseous. Gaseous oxidants can be fed into the container in a simple manner and generate a protective atmosphere in the gas space above the surface of the dispersion. This leads to a particularly long-lasting protection of the dispersion against microbial infestation. The addition of a gaseous oxidant is particularly advantageous since, even if a dispersion batch has been in service for a long time, only slight dilution effects occur.

According to a particularly preferred embodiment of the invention, the oxidant is ozone. If ozone is used as an oxidant in the process according to the invention, there is a particularly long-lasting antimicrobial effect. In addition, ozone, in particular in the amounts expediently provided, is compatible with the common constituents of dispersions, in particular the common constituents of dispersion paints or pigment pastes. In addition, ozone can be produced very easily at the point of use.

The ozone can be generated in different ways. The ozone can preferably be generated in a generator or in the lid of the container, in particular by means of corona discharge.

The ozone can be generated externally, i.e. outside the container, which is part of a metering apparatus, and then introduced into the container. The ozone can be generated, for example, from a chemical reaction of potassium permanganate with concentrated sulfuric acid or by electrolysis of dilute sulfuric acid, in particular at low temperatures. Ozone can also be generated from air or oxygen under the action of UV radiation.

According to a preferred embodiment of the process according to the invention, the ozone is generated in an ozone generator comprising a voltage source, in particular a high-voltage generator, and a discharge unit starting from air, in particular dried air, oxygen, or an oxygen mixture with argon or carbon dioxide. The construction of common ozone generators is known to a person skilled in the art. In the discharge unit, oxygen molecules are dissociated into oxygen atoms, preferably by silent electrical discharge, so-called "corona discharge," after which ozone synthesis and ozone enrichment take place while still being in the plasma of the discharge filaments. The resulting proportion of ozone in the final concentration of the gas mixture can be 1 to 5 wt. % with air as the starting gas and 6 to 13 wt. % with oxygen as the starting gas. Air is preferably used as the starting gas for generating ozone. When the ozone is generated in a generator, ozone is thus produced in a clean manner starting from inexpensive starting materials.

A possible construction of a discharge unit called an ozonizer, which is suitable for the process according to the invention for generating the ozone, is described in DE 197 14 176 A1.

According to a preferred embodiment of the invention, the ozone is generated in the lid of the container. Generating the ozone in the lid of the container has the significant advantage that the ozone has to travel a shorter distance in order to get to the dispersion and thus to the site of action. This embodiment ensures that as little ozone as possible is lost due to the instability of the ozone. In addition, the generation of ozone in the lid of the container is a particularly space-saving and flexible approach.

According to one embodiment of the process according to the invention, the ozone can be generated in the lid of the container by a device arranged in the lid of the container, in that ozone is generated from air or oxygen by UV light. For this purpose, the lid comprises, for example, UV-C light-emitting diodes. According to a specific embodiment of this approach, the lid has an induction plate, a control LED, a plurality of UV-C LEDs, preferably from 2 to 8 LEDs, more preferably from 3 to 5 LEDs, a plurality of blue light LEDs, a battery, and an on/off switch. However, lids having a different specific structure than the lid of the container are also suitable for generating ozone by UV radiation.

According to a more preferred embodiment of the invention, the ozone in the lid of the container is generated by corona discharge. In this case, air or oxygen preferably passes through a tube which is attached directly to the lid of the container via an adapter and which comprises a metal foil, a metal rod, and a cavity. The air passes through the cavity while the metal foil and metal rod are energized and lead to a corona discharge. In this way, ozone is created in the tube, which goes directly into the container. This embodiment creates a particularly efficient protection of the dispersion against microbial infestation.

In a further preferred embodiment, ozone is generated by corona discharge outside the container, but in the immediate vicinity of the container. In this embodiment, the ozone is preferably introduced into the at least one container by means of a pump, in particular a membrane pump. The ozone preferably is introduced uniformly into the container. The pump expediently generates an overpressure. The pump and the container are preferably connected via the supply line, for example a hose system. This ensures that when an ozone generator is used in the immediate vicinity of the containers, all containers can be supplied with a sufficient amount of ozone.

The dispersion is preferably mixed thoroughly after the introduction of the oxidant. According to a preferred embodiment of the process according to the invention, the dispersion is mixed by stirring after the introduction of the oxidant. In this way, the antimicrobial protection provided by the oxidant is distributed throughout the dispersion. In addition, the mixing of the dispersion ensures a stable, homogeneous appearance of the dispersion.

Very different dispersions can be used as the dispersion for the process according to the invention. In a preferred embodiment of the invention, the dispersion is a dispersion paint or a pigment paste. Pigment pastes are described, for example, in EP 2 243 808 B1. Dispersion paints and pigment pastes are particularly suitable for the process according to the invention because, on the one hand, they can be protected particularly well against microbial infestation by the oxidant and, on the other hand, because they are of particular economic importance. If the dispersion is a pigment paste, it can be used, for example, for tinting paints, preferably dispersion paints. Pigment pastes preferably do not contain any binders such as polymer dispersions.

According to a particularly preferred embodiment of the invention, the dispersion paint or pigment paste is substantially free of preservatives. "Substantially free of preservatives" means that the pigment paste contains no more than traces of preservatives, in particular in an amount of less than 2 ppm.

The publications EP 1 297 079 B1, DE 1 031 910, DE 10 2014 013 455 A1 and DE 10 2016 002 221 A1 each describe dispersion paints which are substantially free of preservatives. The dispersion paints described there are outstandingly suitable for the process according to the invention.

Another aspect of the invention also relates to a metering apparatus.

The metering apparatus according to the invention for preserving a dispersion comprises at least one container which is designed for storing a dispersion and has a maximum fill level for the dispersion, a closable metering valve, and at least one supply line for an oxidant leading into the container.

The metering apparatus according to the invention is outstandingly suitable for the antimicrobial protection of the dispersion and for carrying out the process according to the invention.

According to a preferred embodiment of the invention, the container of the metering apparatus according to the invention has means for mixing a dispersion. In this way, the antimicrobial protection provided by the oxidant is distributed throughout the dispersion. In addition, the mixing of the dispersion ensures a stable, homogeneous appearance of the dispersion. The container preferably has an agitator as a means for mixing. An agitator is particularly suitable for effective mixing of the dispersion.

The supply line leading into the container can lead into the container at different levels. The supply line leading into the container can lead into the container above the maximum fill level of the container. This makes it possible to effectively preserve the particularly problematic region for microbial infestation in the gas space above the surface of the dispersion. Furthermore, the construction effort of the supply line is lower since penetration of the dispersion into the supply line does not have to be avoided.

The supply line can also lead into the container below the maximum fill level of the container, preferably into the dispersion. This allows the oxidant to be brought directly into the dispersion. The supply line preferably leads into the container above its maximum fill level.

The supply line leading into the container preferably ends in a nozzle. As a result, the oxidant can be introduced effectively into the container or directly into the dispersion, depending on the level at which the supply line leads into the container. The nozzle is preferably directed in the direction of the container bottom. This nozzle arrangement avoids contamination of the nozzle when the container is filled with new dispersion. According to an alternative preferred embodiment, the supply line leading into the container can be provided at its outlet opening with a protective cap that is open in the direction of the container bottom. The protective cap prevents contamination and the resulting clogging of the outlet opening when the container is filled with dispersion.

According to one embodiment, the supply line leading into the container leads into the container above its maximum fill level and ends in a nozzle.

The oxidant is preferably introduced into the interior of the container via an adapter which closes substantially tight on its upper side with the lid part of the container and on its underside with the side wall of the container, for example in the form of an extension piece for a pipe. The adapter can be designed as a constituent of the container lid. The adapter comprises a supply line with an outlet opening through which the oxidant can be conducted into the interior of the container. The outlet opening can be designed as a nozzle. According to a preferred embodiment of the invention, a protective cap which is open in the direction of the container bottom is located at the outlet opening in the adapter. The protective cap prevents contamination and the resulting clogging of the outlet opening when the container is filled with new dispersion. Suitable adapters are described, for example, in FIGS. 3 to 8 and the associated descriptions of the drawings. While the adapters shown in FIGS. 3 to 8 are optimized for operation with ozone as the oxidant, they can also be operated with any other liquid or gaseous oxidant. The advantage of using adapters is that existing metering apparatuses can be converted for operation with the process according to the invention in a simple manner and without complex measures (such as drilling holes in the container walls for the supply line of the oxidant).

It is also conceivable that the at least one container has more than one supply line leading into the container. For example, the container can have two or more supply lines leading into the container. The supply lines can lead into the container at the same level, for example above the maximum fill level. This leads to a more even distribution. However, a plurality of supply lines per container can also lead into the container at different levels, for example above and below the maximum fill level. As a result, a direct introduction of the oxidant into the dispersion and a treatment of the container above the maximum fill level can be achieved. The supply lines can also each end in a nozzle.

According to a preferred embodiment of the invention, the at least one container is made of plastics material. Plastics material is a good material for containers because it is resistant to many oxidants. The container is preferably made of polyoxymethylene (POM), polypropylene, polyethylene, polyethylene terephthalate, polyamide or mixtures or blends thereof. These plastics material types have proven to be particularly resistant and durable. In addition to the plastics material mentioned above, stainless steel can also be used as the material for the at least one container.

The at least one container can have very different shapes. According to a possible embodiment of the invention, the at least one container is cuboid. According to a preferred embodiment of the invention, the container is substantially cylindrical. In the case of a substantially cylindrical configuration of the container, deposits in corners or edges of the container are avoided and protection against microbial infestation is increased.

According to a further embodiment of the invention, the metering apparatus has at least two, preferably at least three or at least four containers. The containers can contain different dispersions and can be controlled via a common control device. In this way, different dispersions can be handled from a control system and the dispersions can be precisely mixed with one another.

If the metering apparatus has a plurality of containers, the containers can be arranged in the manner of a carousel or in a stationary manner. The plurality of containers is preferably arranged in the manner of a carousel. One or more buckets for receiving the dispersions can then be located concentrically in the central axis on a carousel. In this embodiment, the dispersions of the plurality of containers can be mixed with one another particularly well.

According to a further preferred embodiment of the invention, the supply line is made of a material containing at least one plastics material selected from the group consisting of polyurethane (PUR), polytetrafluoroethylene (PTFE), perfluoroalkoxy polymer (PFA), polyvinylidene fluoride, perfluorinated rubber, ethylene-tetrafluoroethylene, tetrafluoroethylene hexafluoropropylene copolymer, ethylene-chlorotrifluoroethylene, ethylene-propylene-diene rubber, and mixtures thereof. The material of the supply line can also consist of one of the aforementioned plastics materials. Materials containing or consisting of the aforementioned plastics materials are distinguished by a high stability toward strong oxidants. A supply line made from these materials therefore has a long service life and a high degree of flexibility. A supply line made of the materials mentioned is particularly suitable for supplying hydrogen peroxide, sodium hypochlorite solutions, and/or ozone.

The supply line can for example comprise or consist of one or more hoses. The supply line can be formed by a hose system.

If the metering apparatus contains more than one container, the metering apparatus can also have more than one supply line leading into the container. Each container of the metering apparatus which is designed to store a dispersion preferably has a supply line leading into the container.

According to a preferred embodiment, the metering apparatus according to the invention comprises an ozone generator. The ozone generator preferably comprises a voltage source, in particular a high-voltage generator, and a discharge unit. Ozone is preferably generated in the discharge unit by means of corona discharge. This form of ozone generation has proven to be particularly efficient.

According to one embodiment of the invention, the voltage source, in particular the high-voltage generator, and the discharge unit, are arranged in the same device housing. This makes it possible for the corona discharge to take place centrally in the metering apparatus and thus spatially separated from the at least one container. This means that ozone can be generated centrally in the metering apparatus in one place. The centrally generated ozone can then be distributed in the metering apparatus, preferably via the supply line leading into the at least one container. This embodiment generally comprises at least one ozone generator and optionally at least one pump, in particular a membrane pump, for transporting the ozone into the at least one container, preferably via the supply line. With the help of the pump, the at least one container is supplied with ozone via the supply line. The pump preferably generates an overpressure. The pump advantageously supplies the at least one container uniformly with the ozone generated. In the case of a metering apparatus with more than one container and when using an ozone generator in the immediate vicinity of the container, it can be ensured with the optional pump that all containers can be supplied with a sufficient amount of ozone.

According to a further embodiment of the invention, the voltage source, in particular the high-voltage generator, and the discharge unit are not arranged in the same device housing. The discharge unit is preferably in the container lid, preferably in an adapter of the container lid. According to this embodiment of the invention, ozone is preferably generated in the respective container lids by means of corona discharge. For this purpose, the container lids preferably have a lid part and an adapter. The ozone is then generated in these adapters by means of corona discharge. In this way, the path that the ozone generated in situ has to travel is minimized and thus the amount of reactive ozone available for the preservation of the dispersion is maximized.

For the preparation of the ozone, what has been said above in connection with the process according to the invention applies accordingly.

According to a particularly preferred embodiment of the invention, the metering apparatus is connected to a control device, preferably a computer, for precise metering of the dispersion.

The metering apparatus can furthermore comprise a metering valve. The closable valve is preferably a metering valve. Furthermore, the metering apparatus can comprise a feed line. The metering apparatus can also comprise a feed pump. The dispersion can be introduced into the feed line with the feed pump. The metering valve is preferably attached to the feed line. If the metering apparatus includes a metering valve, the metering valve is preferably connected to the control device. The dispersion can be brought through the feed line with the aid of a feed pump, which is preferably also connected to the control device, from the container, preferably via a filling head, onto a scale or into a bucket that rests on the scale. The scale is preferably also connected to the control device in order to allow the feed pump and the metering valve to be controlled as a function of the weighed amount of dispersion. In addition to gravimetric metering, the quantity can also be defined volumetrically using pumps, in particular metering pumps such as gear pumps, reciprocating piston pumps, eccentric screw pumps, or membrane pumps. The advantage of this embodiment is that there is no need for a scale at all.

The described system of a metering apparatus allows for a particularly precise metering of the dispersion, which can be used flexibly.

To ensure thorough mixing of the dispersion in the bucket on the scale, the scale can either be connected to a shaker for homogeneous mixing, the bucket can be equipped with a stirring system, or the scale itself can have an integrated motion controller. A separate vibrating machine can also be used for homogeneous mixing. A fully metered bucket can be clamped in a vibrating machine and vigorously mixed by means of oscillating and rotating movements.

A keyboard or similar input device is connected to the control device. The metering apparatus can thus be controlled and, in particular, the metering valves and the feed pumps for the dispersions can be controlled in accordance with the desired quantities.

In addition, a printer can be provided on the control device for a label to be attached to a bucket, with which the data can also be machine-readable, for example, as a barcode printed on the label in order to settle the dispersion paint filled into the bucket at the cash register after the label has been affixed.

The metering apparatus according to the invention is particularly well suited as a mixing apparatus for paints, also called a "paint mixing apparatus." A further aspect of the invention therefore relates to a paint mixing apparatus having a metering apparatus described herein.

In the case of a metering apparatus for mixing paints, a plurality of containers is preferably controlled with one another via a control system, so that different dispersions can be combined with one another. For example, some containers may contain dispersions with fillers and/or polymer dispersions, while other containers contain dispersions with pigment. However, it is also possible that a container already contains all substantial components for a dispersion paint as a concentrate and then becomes a dispersion paint by diluting it with water. Furthermore, each of the containers can contain a pigment paste. With the pigment pastes in the various containers, a base color, for example a white dispersion paint, can be tinted until the desired hue is achieved.

According to a preferred embodiment, the dispersions consist of different colored pigment pastes, which are added volumetrically combined in a prefabricated base material, which is already in the container for sale as a defined amount of material, in order to achieve the desired hue.

Computer-aided advice and product selection result in a multitude of possible combinations. If, for example, a red matte interior paint is to be mixed, the input device can be used to set a high proportion of pigment red paste with, depending on the shade, lower proportions of pigment blue paste and pigment black paste. Before that, the input device is used to balance the amount of base paint in the bucket on the scales. The metering valves and feed pumps are then controlled accordingly via the control device, the metering valves being closed and the feed pumps being switched off when the predetermined amount of pigment pastes fed into the bucket is reached, as measured by the scales. The same process can also be carried out with volumetric metering, in which case the scale is dispensed with.

What has been said in connection with the process according to the invention for the oxidant and for the introduction of the oxidant also applies equally to the metering apparatus according to the invention.

What has been said in connection with the process according to the invention for the dispersion also applies equally to the metering apparatus according to the invention.

The metering apparatus according to the invention is particularly suitable for carrying out the process according to the invention.

The invention also relates to the use of an oxidant for preserving dispersions.

It has been found that oxidants are excellent for preserving dispersions.

According to a preferred embodiment of the use according to the invention, the oxidant is ozone. Ozone has proven to be particularly suitable for the preservation of dispersions.

According to a further preferred embodiment of the use according to the invention, the dispersion is a pigment paste. Pigment pastes can be very well protected against microbial infestation with oxidants and are of particular economic importance, in particular in paint mixing apparatuses.

What has been said in connection with the metering apparatus according to the invention for the oxidant and for the introduction of the oxidant also applies equally to the use according to the invention.

What has been said in connection with the metering apparatus according to the invention for the dispersion also applies equally to the use according to the invention.

The invention is explained in more detail below with reference to the drawings, which, however, serve only for illustration and are not limiting.

Figure 2:
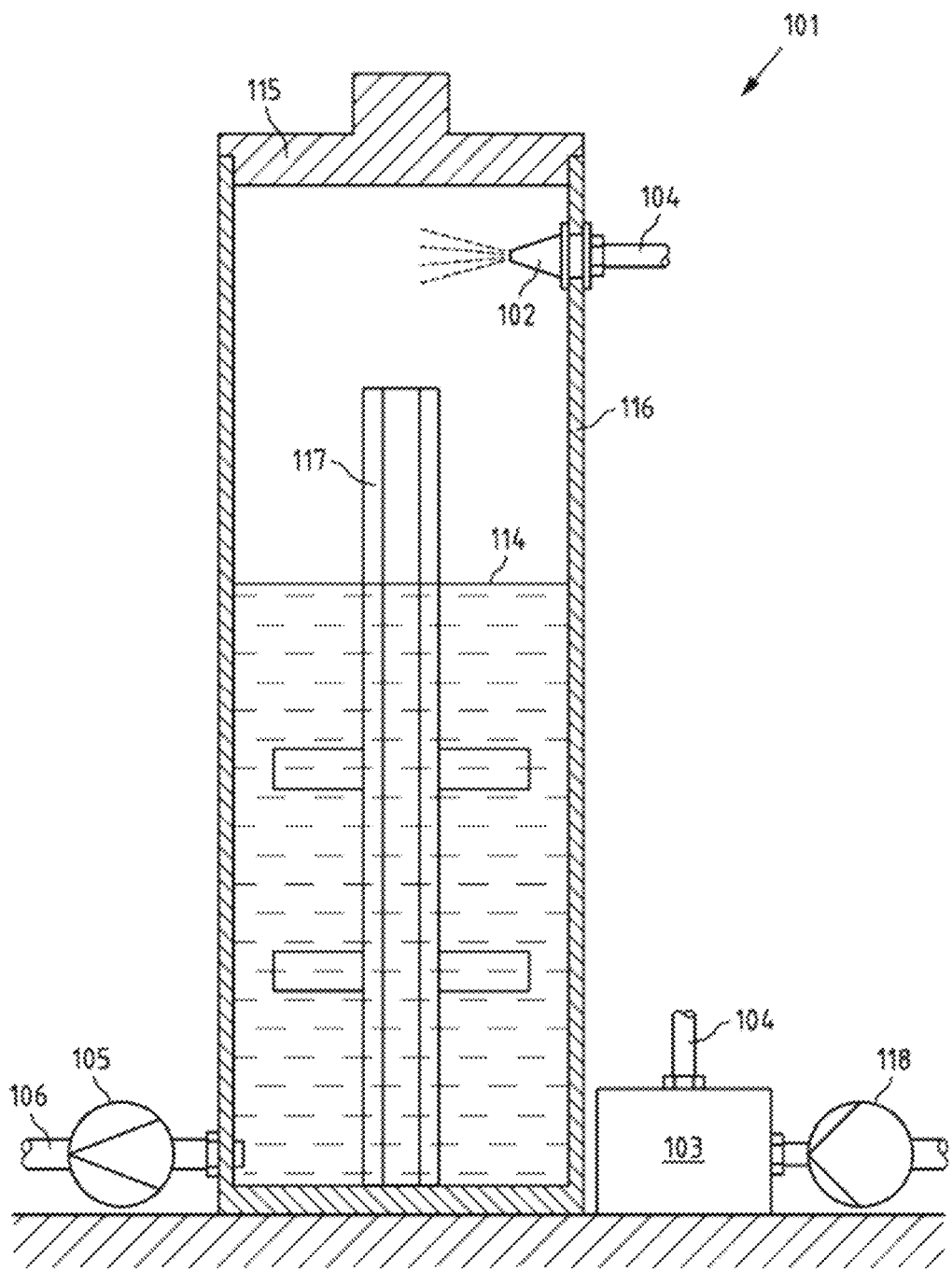
Figure 3:
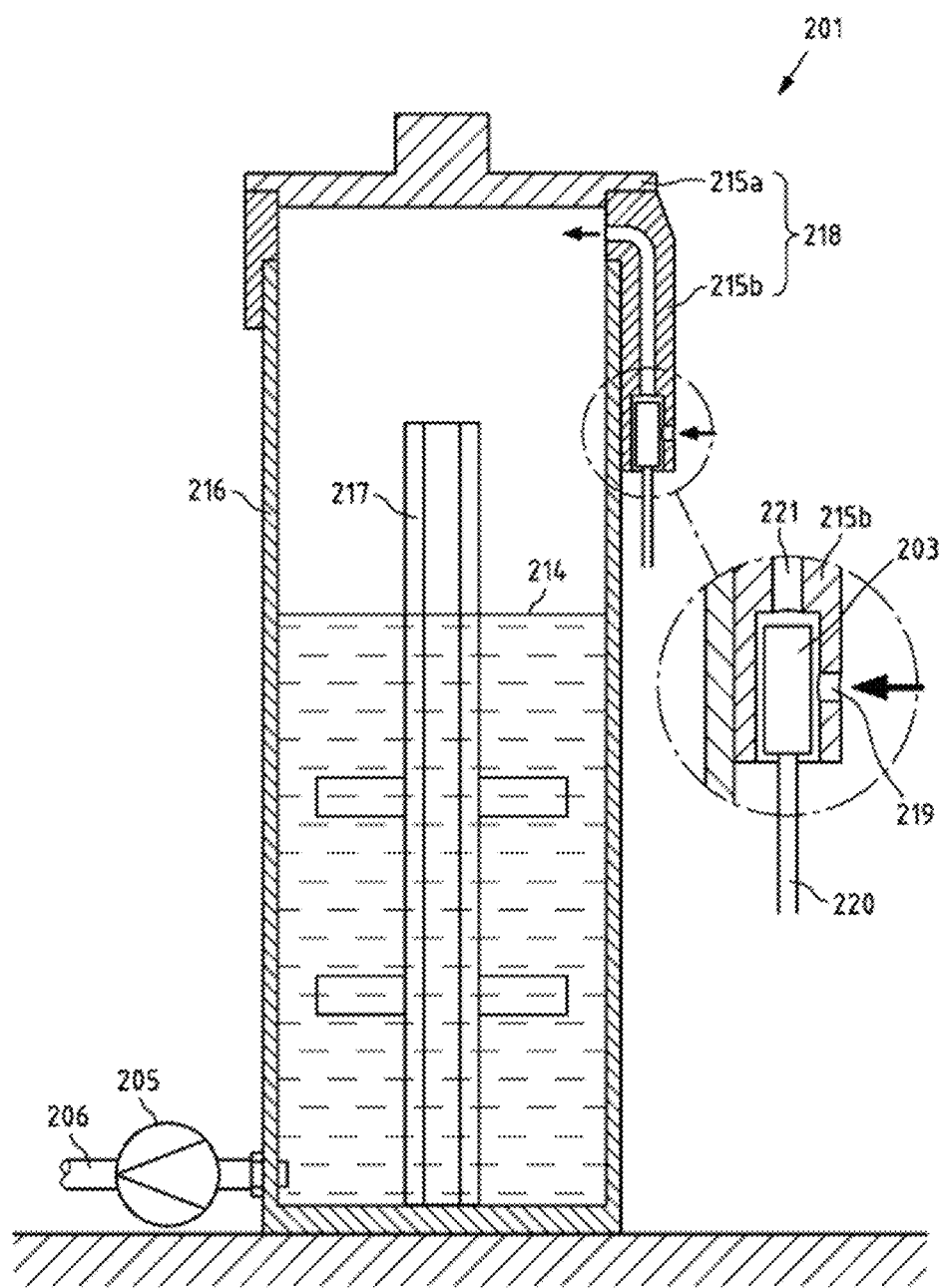
Figure 4:
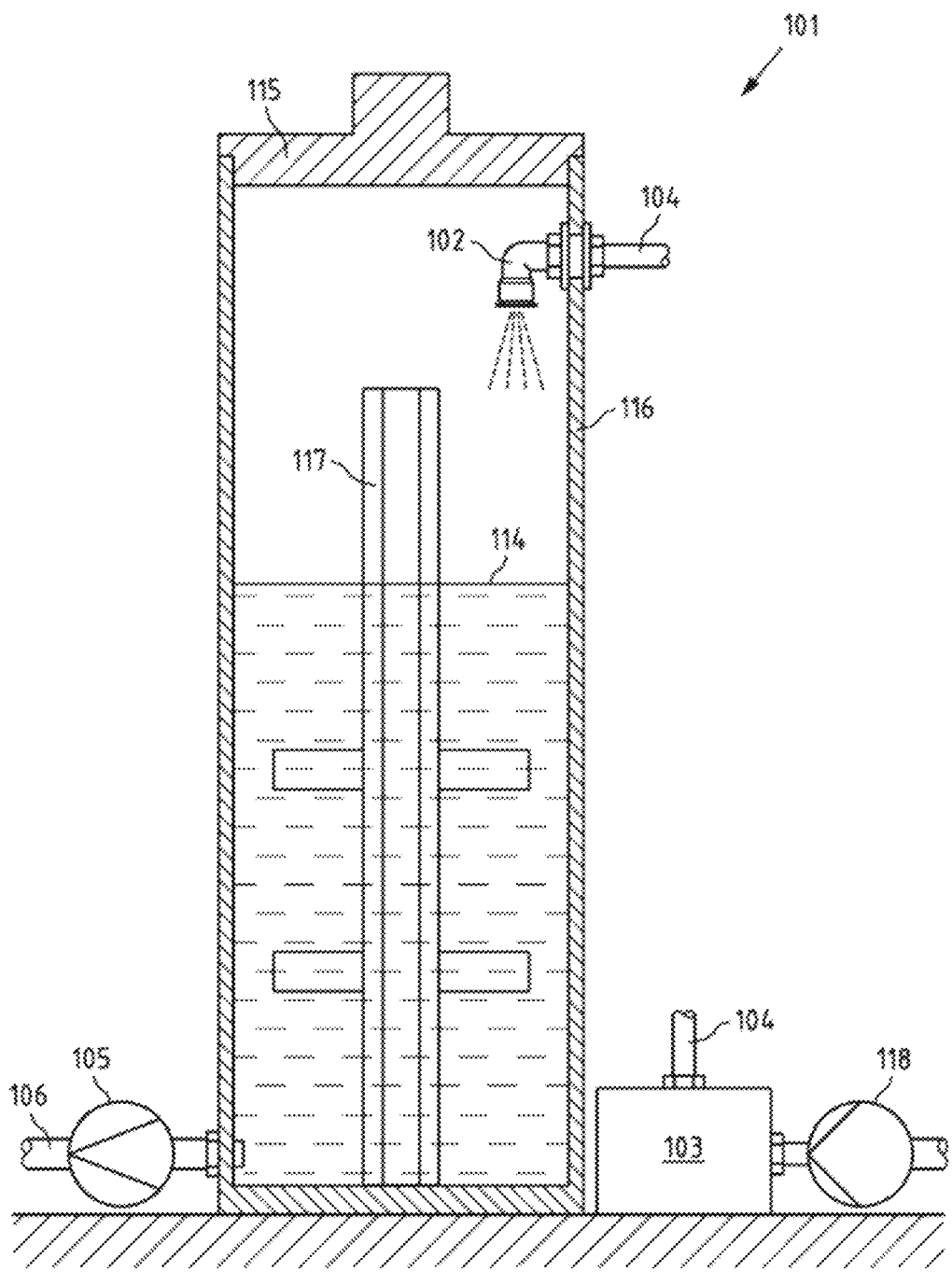
Figure 5:
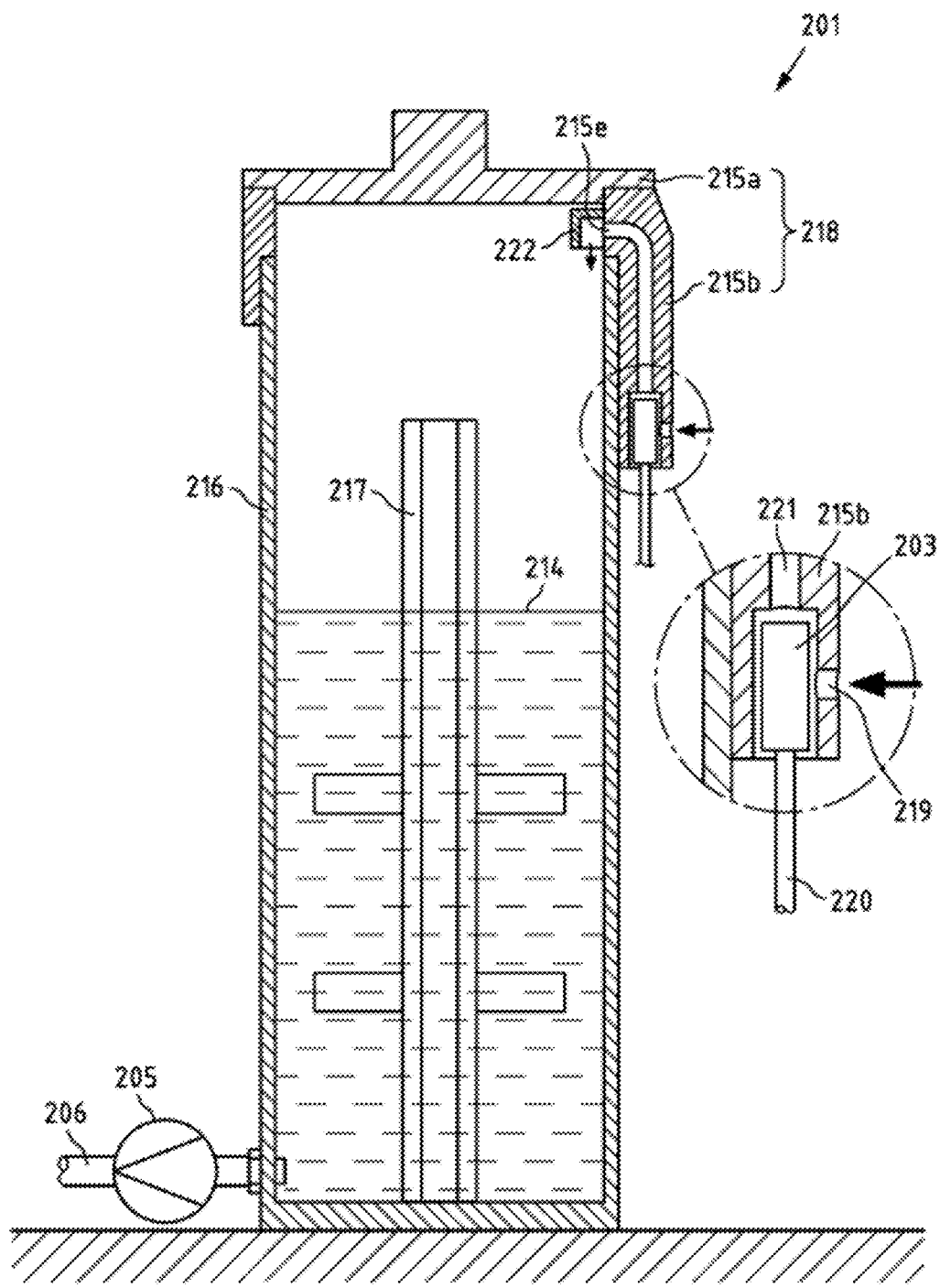
Figure 6:
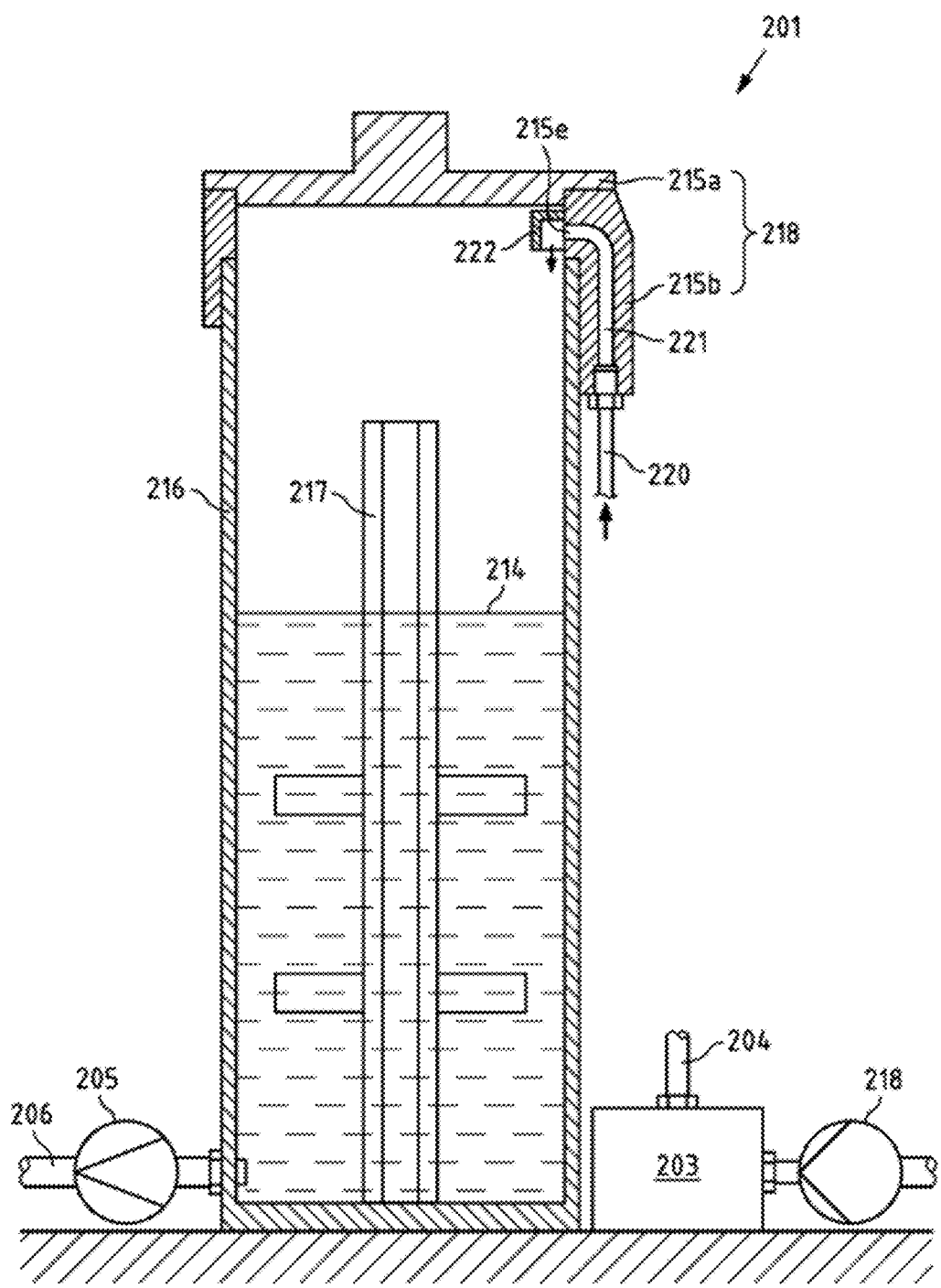
Figure 7A:
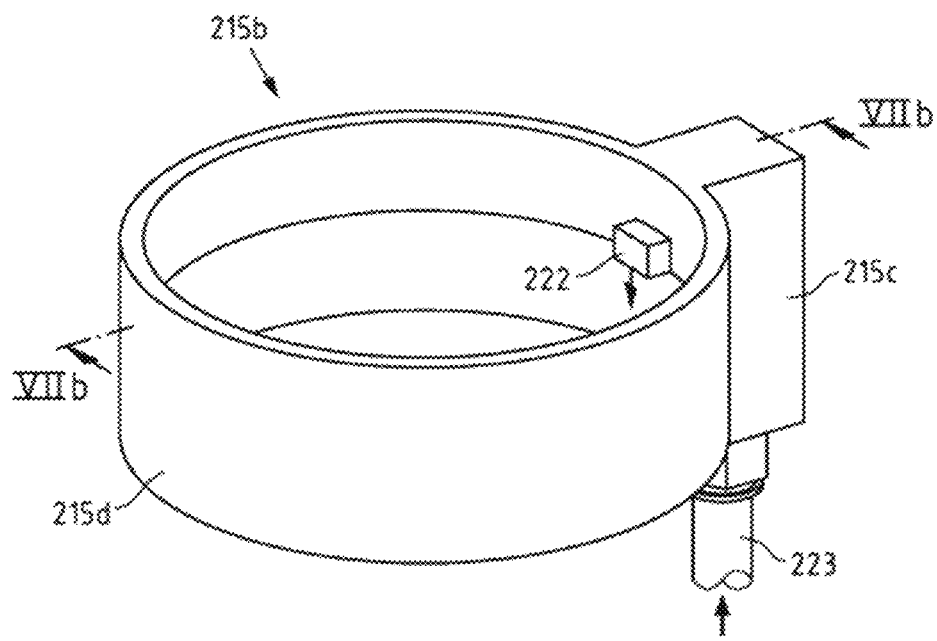
Figure 7B:
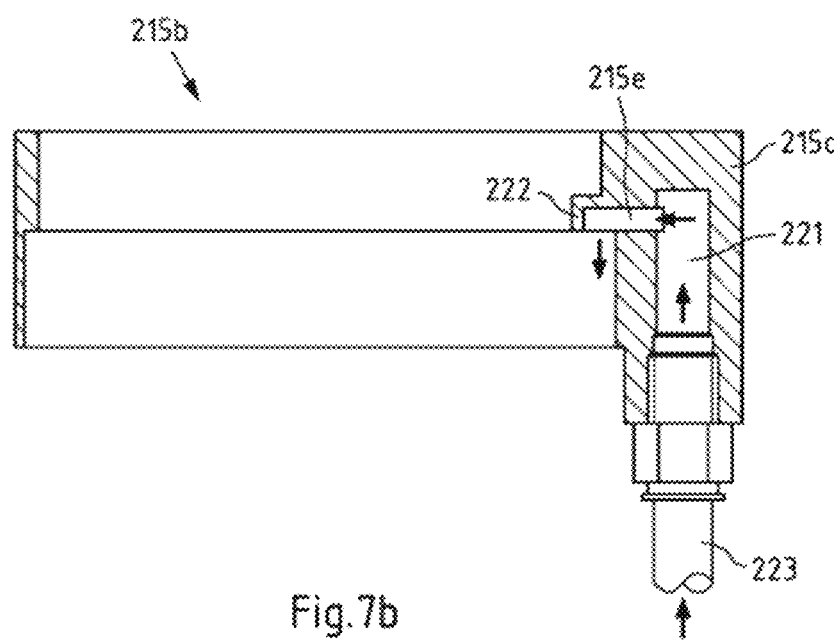
Figure 8A:
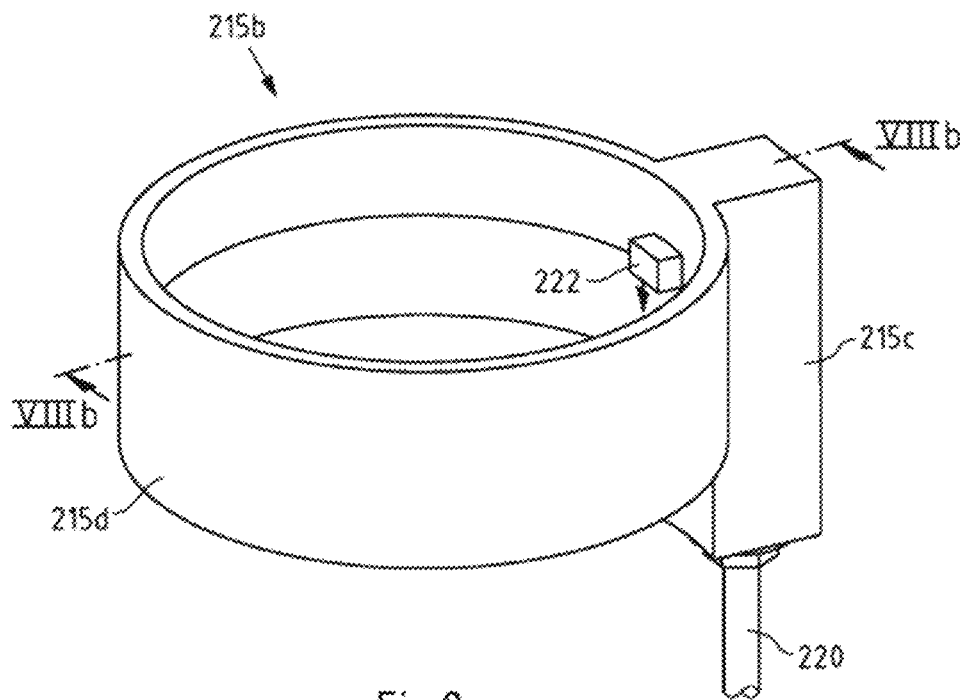
Figure 8B:
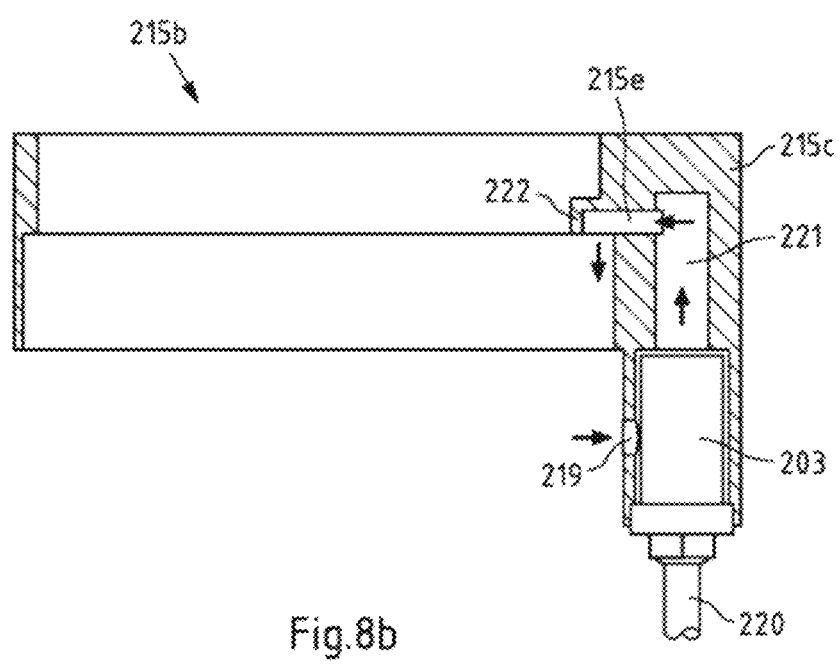

FIG. 1 shows an embodiment of the metering apparatus according to the invention, FIG. 2 shows a container in cross section according to an embodiment of the metering apparatus according to the invention with a central ozone generator, FIG. 3 shows a container in cross section according to an embodiment of the metering apparatus according to the invention with ozone generation in the lid of the container, FIG. 4 shows a container in cross section according to an embodiment of the metering apparatus according to the invention with a central ozone generator, FIG. 5 shows a container in cross section according to an embodiment of the metering apparatus according to the invention with ozone generation in the lid of the container, FIG. 6 shows a container in cross section according to an embodiment of the metering apparatus according to the invention with a central ozone generator, FIG. 7a is a perspective view of an adapter of the container lid according to an embodiment of the invention with ozone generation in a central ozone generator, FIG. 7b shows the adapter of the container lid from FIG. 7a in cross section, FIG. 8a is a perspective view of an adapter of the container lid according to an embodiment of the invention with ozone generation in the lid of the container, FIG. 8b shows the adapter of the container lid from FIG. 8a in cross section.

FIG. 1 shows a preferred embodiment of the metering apparatus according to the invention comprising, in the present case, a plurality of containers 1. The containers 1 each have a maximum fill level for a dispersion (not shown in FIG. 1). Each container 1 also has a closable metering valve 7 and a supply line for an oxidant leading into the container 1, each supply line going off from a ring line 4 feeding the individual supply lines. The ring line 4 and the supply lines are made of polyurethane. In the present case, eight cylindrical containers 1 made of polyoxymethylene with a volume of one liter each are arranged like a carousel, the ozone being introduced into the respective container 1 through a nozzle 2 arranged at the end of each supply line. The ozone is generated centrally in an ozone generator 3, comprising a voltage source, in particular a high-voltage generator, and a discharge unit, with an output of 200 mg ozone per hour and, as mentioned, arrives with the aid of a membrane pump 14 via the supply line through the nozzles 2 in the cylindrical containers 1. As a result, about 2 mg of ozone can be introduced in each case into the containers 1 within five minutes. The dispersion contained in the cylindrical containers 1 is pumped out via feed pumps 5 and discharged along feed lines 6. The metering valves 7 built into the feed lines 6 allow for the precise metering of the dispersion contained in the containers 1. After passing through the metering valve 7, the dispersions are passed on via the feed lines 6 to a filling head 8 and from there pass into a bucket 9. The bucket 9 stands on a scale 10. The feed pumps 5, the metering valves 7, and the scales 10 are connected via the control line 11 to a computer 12, via which an exact metering of the dispersion is controlled. The computer 12 is also connected to a printer 13 which is suitable for printing labels.

FIG. 2 shows a container in longitudinal section according to an embodiment of the metering apparatus according to the invention with an external ozone generator. In the external ozone generator 103, comprising a voltage source, in particular a high-voltage generator, and a discharge unit, the oxidant ozone is generated and with the help of a membrane pump 118 passes through the polyurethane supply line 104 through the nozzle 102 into the cylindrical polyoxymethylene container 101 into the gas space above the surface 114 of a dispersion located in the container 101. The surface 114 of the dispersion coincides here with the maximum fill level of the container 101. The cylindrical container 101 is equipped with a lid 115 and a side wall 116. The dispersion located in the interior of the cylindrical container 101 is mixed by the agitator 117. The dispersion is pumped out of the container 101 along the feed line 106 with the aid of the feed pump 105.

FIG. 3 shows a container 201 in a longitudinal section according to an embodiment of the metering apparatus according to the invention with ozone generation in an adapter 215b as part of the container lid 218. For this purpose, air, oxygen, or an oxygen-containing gas mixture, hereinafter "oxygen gas mixture," is introduced through the opening 219 into the interior of the adapter 215b, in which a discharge unit 203 is arranged, which is connected to a high-voltage generator via the high-voltage connection 220. The ozone/air, ozone/oxygen, or ozone/oxygen gas mixture produced in the discharge unit passes along the supply line 221 into the interior of the cylindrical container 201 and there into the region above the surface 214 of a dispersion located in the container 201. The cylindrical container 201 is equipped with a lid 218 comprising a lid part 215a and, as mentioned above, an adapter 215b and a side wall 216. The dispersion located in the interior of the cylindrical container 201 is mixed by the agitator 217. The dispersion is pumped out of the container 201 along the feed line 206 with the aid of the feed pump 205.

FIG. 4 shows a container in longitudinal section according to an embodiment of the metering apparatus according to the invention with an external ozone generator. In the external ozone generator 103, comprising a voltage source, in particular a high-voltage generator, and a discharge unit, the oxidant ozone is generated and with the help of a membrane pump 118 passes through the polyurethane supply line 104 through the nozzle 102 into the cylindrical polyoxymethylene container 101 into the gas space above the surface 114 of a dispersion located in the container 101. The nozzle 102 is directed in the direction of the container bottom. This nozzle arrangement avoids contamination of the nozzle 102 when the container 101 is filled with the dispersion. The surface 114 of the dispersion coincides here with the maximum fill level of the container 101. The cylindrical container 101 is equipped with a lid 115 and a side wall 116. The dispersion located in the interior of the cylindrical container 101 is mixed by the agitator 117. The dispersion is pumped out of the container 101 along the feed line 106 with the aid of the feed pump 105.

FIG. 5 shows a container 201 in a longitudinal section according to an embodiment of the metering apparatus according to the invention with ozone generation in an adapter 215b as part of the container lid 218. For this purpose, the oxygen gas mixture is introduced through the opening 219 into the interior of the adapter 215b, in which a discharge unit 203 is arranged, which is connected to a high-voltage generator via the high-voltage connection 220. The ozone/air, ozone/oxygen, or ozone/oxygen gas mixture produced in the discharge unit passes along the supply line 221 into the interior of the cylindrical container 201 and there into the region above the surface 214 of a dispersion located in the container 201. At the outlet opening 215e of the supply line 221, through which the ozone/air, ozone/oxygen or ozone/oxygen gas mixture reaches the interior of the cylindrical container 201, there is a downwardly opened protective cap 222. The protective cap 222 avoids contamination and the resultant clogging of the outlet opening 215e when the container 101 is filled with dispersion. The cylindrical container 201 is equipped with a lid 218 comprising a lid part 215a and, as mentioned above, an adapter 215b and a side wall 216. The dispersion located in the interior of the cylindrical container 201 is mixed by the agitator 217. The dispersion is pumped out of the container 201 along the feed line 206 with the aid of the feed pump 205.

FIG. 6 shows a container in longitudinal section according to an embodiment of the metering apparatus according to the invention with an external ozone generator. The introduction of the ozone into the interior of the container 201 takes place via an adapter 215b as part of the container lid 218. In the external ozone generator 203, comprising a voltage source, in particular a high-voltage generator, and a discharge unit, the oxidant ozone is generated and, with the aid of a membrane pump 218, reaches the adapter 215b via the polyurethane supply line 204. The supply line 204 is connected to the adapter 215b via a connecting piece 223. The ozone passes through the supply line 221 into the cylindrical container 201 made of polyoxymethylene into the gas space above the surface 214 of a dispersion located in the container 201. At the outlet opening 215e of the supply line 221, through which the ozone reaches the interior of the cylindrical container 201, there is a downwardly opened protective cap 222. The protective cap 222 avoids contamination and the resultant clogging of the outlet opening 215e when the container 101 is filled with dispersion. The cylindrical container 201 is equipped with a lid 218 comprising a lid part 215a and, as mentioned above, an adapter 215b and a side wall 216. The dispersion located in the interior of the cylindrical container 201 is mixed by the agitator 217. The dispersion is pumped out of the container 201 along the feed line 206 with the aid of the feed pump 205.

FIGS. 7a and 7b show an adapter 215b for use in a metering apparatus according to the invention having an external ozone generator. The adapter 215b comprises a connecting portion 215c and an annular portion 215d connected thereto. The annular portion 215d is designed in such a way that it closes substantially tight on its upper side with the lid part 215a and on its lower side with the side wall of the container 201. The connecting portion 215c has a connecting piece 223 for a gas supply line, via which the adapter 215b can be connected to the ozone supply line 204. The connecting portion 215c comprises a supply line 221, via which the ozone is conducted through the outlet opening 215e into the interior space delimited by the annular portion. At the outlet opening 215e, there is a downwardly opened protective cap 222 which prevents the dispersion from entering the outlet opening when the container 201 is being filled.

FIGS. 8a and 8b show an adapter 215b for use in a metering apparatus according to the invention with ozone generation in the adapter 215b as part of the container lid 218. The adapter 215b comprises a connecting portion 215c and an annular portion 215d connected thereto. The annular portion 215d is designed in such a way that it closes substantially tight on its upper side with the lid part 215a and on its lower side with the side wall of the container 201. A discharge unit 203, which is connected to a high-voltage generator via the high-voltage connection 220, is arranged in the interior of the connecting portion 215c. The connecting portion 215c comprises a supply line 221 via which the ozone/air, ozone/oxygen, or ozone/oxygen gas mixture formed in the discharge unit is passed through the outlet opening 215e into the interior space delimited by the annular portion. At the outlet opening 215e, there is a downwardly opened protective cap 222 which prevents the dispersion from entering the outlet opening when the container 201 is being filled.

The containers and adapters shown in FIGS. 2 to 8 are particularly suitable for operation with gaseous oxidants such as ozone. However, they can also be operated with any other oxidant described herein, in particular with liquid oxidants. The material information contained in the description of the drawings (such as, for example, polyoxymethylene for the container or polyurethane for the supply line) is not substantial for carrying out the invention and can be replaced by any other suitable materials, in particular the materials described herein. The shape information contained in the description of the drawings (such as, for example, cylindrical containers) is not substantial for the implementation of the invention and can be replaced by any other suitable shape (such as, for example, cuboid containers, etc.). Also, for example, the exact number and position of the supply lines for the oxidant in the interior of the container or the adapter given in the description of the drawings are not substantial for the implementation of the invention and can, in particular, be varied accordingly, in particular as described herein.

LIST OF REFERENCE SIGNS

1 Container
2 Nozzle
3 Ozone generator
4 Supply line
5 Feed pump
6 Feed line
7 Metering valve
8 Filling head
9 Bucket
10 Scale
11 Control lines
12 Computer
13 Printer
14 Membrane pump
101 Container
102 Nozzle
103 Ozone generator
104 Supply line
105 Feed pump
106 Feed line
114 Surface of the dispersion
115 Lid
116 Side wall
117 Agitator
118 Membrane pump
201 Container
203 Discharge unit
205 Feed pump
206 Feed line
214 Surface of the dispersion
215a Lid part
215b Adapter
215c Connecting portion
215d Annular portion
215e Outlet opening
216 Side wall
217 Agitator
218 Container lid
219 Opening
220 High-voltage connection
221 Supply line
222 Protective cap
223 Connecting piece

What is claimed is:

1. A process for preserving a dispersion paint or a pigment paste in a metering apparatus, the process comprising:
    storing the dispersion paint or the pigment paste in a container which is part of the metering apparatus;
    contacting the dispersion paint or the pigment paste with a gaseous oxidant, wherein the gaseous oxidant is introduced into a gas space above a surface of the dispersion paint or the pigment paste in the container, the gaseous oxidant comprising antimicrobial protection; and
    after the gaseous oxidant is introduced into the gas space above the surface of the dispersion paint or the pigment paste, mechanically mixing the dispersion paint or the pigment paste to distribute the gaseous oxidant throughout the dispersion paint or the pigment paste.

2. The process of claim 1, wherein the contacting step further comprises introducing the gaseous oxidant into the container at least once a month.

3. The process of claim 1, wherein the contacting step further comprises introducing into the container about 0.1 mg to about 200 mg of gaseous oxidant per liter of container volume per introduction.

4. The process of claim 1, further comprising mechanically mixing the dispersion paint or the pigment paste concurrently with the introduction of the gaseous oxidant.

5. The process of claim 3, wherein the gaseous oxidant has a standard potential of about 0.1 V or higher with respect to the standard hydrogen electrode at a temperature of 25° C. and an effective concentration of 1 mol·L$^{-1}$ and/or at a partial pressure of 101.325 kPa.

6. The process of claim 5, wherein the gaseous oxidant is an oxygen-based oxidant comprising hydrogen peroxide, ozone, peroxyacetic acid, sodium perborate, sodium percarbonate, or any combination thereof.

7. The process of claim 5, wherein the gaseous oxidant is a chlorine-based oxidant comprising sodium hypochlorite, potassium hypochlorite, chlorine, or any combination thereof.

8. The process of claim 1, wherein the gaseous oxidant is ozone.

9. The process of claim 8, further comprising the step of generating ozone, using an ozone generator that fluidly communicates with the container of the metering apparatus.

10. The process of claim 9, wherein the ozone generator generates ozone by corona discharge.

11. The process of claim 9, wherein the ozone generator is situated on or within a lid of the container.

12. The process of claim 3, wherein the dispersion paste or the pigment paste is substantially free of preservative before the introduction of the gaseous oxidant.

* * * * *